US010915537B2

(12) United States Patent
Bhide et al.

(10) Patent No.: US 10,915,537 B2
(45) Date of Patent: *Feb. 9, 2021

(54) SYSTEM AND A METHOD FOR ASSOCIATING CONTEXTUAL STRUCTURED DATA WITH UNSTRUCTURED DOCUMENTS ON MAP-REDUCE

(71) Applicant: International Business Machines Corporation, Armonk, NY (US)

(72) Inventors: Manish A. Bhide, Hyderabad (IN); Himanshu Gupta, New Delhi (IN); Mukesh K. Mohania, New Delhi (IN); Scott Schumacher, Porter Ranch, CA (US)

(73) Assignee: International Business Machines Corporation, Armonk, NY (US)

( * ) Notice: Subject to any disclaimer, the term of this patent is extended or adjusted under 35 U.S.C. 154(b) by 600 days.

This patent is subject to a terminal disclaimer.

(21) Appl. No.: 15/229,485

(22) Filed: Aug. 5, 2016

(65) Prior Publication Data

US 2017/0060915 A1    Mar. 2, 2017

Related U.S. Application Data

(63) Continuation of application No. 14/837,804, filed on Aug. 27, 2015.

(51) Int. Cl.
*G06F 16/2457* (2019.01)
*G06F 16/93* (2019.01)
*G06F 16/33* (2019.01)

(52) U.S. Cl.
CPC ...... *G06F 16/24578* (2019.01); *G06F 16/334* (2019.01); *G06F 16/3331* (2019.01); *G06F 16/93* (2019.01)

(58) Field of Classification Search
CPC ......... G06F 17/30303; G06F 17/30011; G06F 17/30424; G06F 17/3053; G06F 17/30657

(Continued)

(56) References Cited

U.S. PATENT DOCUMENTS

| 8,126,892 B2 | 2/2012 | Chakravarthy et al. |
| 8,230,332 B2 * | 7/2012 | Summers .............. G06F 16/832 715/239 |

(Continued)

FOREIGN PATENT DOCUMENTS

CN    103678665 A    3/2014

OTHER PUBLICATIONS

Agashe V. et al. "Harness Insight from Hadoop with MapReduce and Text Data Processing Using SAP® Data Services and SAP HANA®". SAP Co-Innovation Lab, 2013. Publisher SAP AG. pp. 1-15.

(Continued)

*Primary Examiner* — Hosain T Alam
*Assistant Examiner* — Nicholas E Allen
(74) *Attorney, Agent, or Firm* — Edward J. Wixted, III

(57) ABSTRACT

In an approach for integrating documents a processor extracts a first set of keywords from at least one structured document. A processor generates a first batch of keywords from the first set of keywords, wherein each keyword in the first batch of keywords includes a weight. A processor extracts a second set of keywords from at least one unstructured document. A processor compares the first batch of keywords to the second set of keywords. A processor determines that the at least one unstructured document matches, based on a predetermined threshold, the at least one structured document, based on the comparison of the first batch of keywords to the second set of keywords. A processor (Continued)

removes the at least one unstructured document from a list of unstructured documents which are to be processed.

7 Claims, 4 Drawing Sheets

(58) Field of Classification Search
USPC .......................................................... 707/750
See application file for complete search history.

(56) References Cited

U.S. PATENT DOCUMENTS

| | | | | |
|---|---|---|---|---|
| 8,498,983 B1* | 7/2013 | Zhang | ................. | G06F 16/3346 707/731 |
| 8,706,742 B1* | 4/2014 | Ravid | ..................... | G06N 5/04 707/749 |
| 9,092,802 B1* | 7/2015 | Akella | ............... | G06Q 30/0256 |
| 2003/0115189 A1* | 6/2003 | Srinivasa | .............. | G06F 16/335 |
| 2005/0138026 A1* | 6/2005 | Liu | ........................ | G06F 16/355 |
| 2007/0288514 A1* | 12/2007 | Reitter | ................... | G06F 16/951 |
| 2008/0025617 A1* | 1/2008 | Posse | ....................... | G06K 9/62 382/224 |
| 2008/0208796 A1* | 8/2008 | Messer | .................. | G06Q 30/02 |
| 2009/0063470 A1* | 3/2009 | Peled | .................... | G06F 17/278 |
| 2009/0119275 A1* | 5/2009 | Chen | ...................... | G06Q 30/02 |
| 2010/0114899 A1* | 5/2010 | Guha | .................. | G06F 16/9535 707/741 |
| 2010/0131563 A1* | 5/2010 | Yin | ....................... | G06F 16/338 707/794 |
| 2010/0228693 A1* | 9/2010 | Dawson | .............. | G06F 17/2705 706/12 |
| 2011/0082872 A1* | 4/2011 | Loftus | ................. | G06F 16/3331 707/756 |
| 2011/0119262 A1* | 5/2011 | Dexter | .................. | G06F 16/951 707/726 |
| 2011/0231382 A1* | 9/2011 | Xu | ........................ | G06F 16/951 707/706 |
| 2012/0310868 A1* | 12/2012 | Martins | ................. | G06F 16/313 706/12 |
| 2013/0268532 A1* | 10/2013 | Doshi | .................... | G06F 16/285 707/737 |
| 2013/0325882 A1* | 12/2013 | Deshpande | ............. | G06F 16/33 707/755 |
| 2014/0040275 A1* | 2/2014 | Dang | .................. | G06F 17/2785 707/741 |
| 2014/0075004 A1* | 3/2014 | Van Dusen | ............. | H04L 41/04 709/223 |
| 2014/0156681 A1* | 6/2014 | Lee | ...................... | G06F 16/9535 707/754 |
| 2014/0236958 A1* | 8/2014 | Vaughn | ................... | G06F 17/40 707/741 |
| 2014/0289188 A1* | 9/2014 | Shimanovsky | ........ | G06F 16/951 707/609 |
| 2014/0324879 A1* | 10/2014 | Trease | .................. | G06F 16/951 707/741 |
| 2014/0379386 A1* | 12/2014 | Drennan | ................ | G06Q 40/08 705/4 |
| 2014/0379699 A1* | 12/2014 | Blyumen | ............ | G06F 3/04842 707/722 |
| 2014/0379723 A1* | 12/2014 | Page | .................. | G06Q 30/0201 707/740 |
| 2015/0026153 A1* | 1/2015 | Gupta | ...................... | G06N 5/04 707/711 |
| 2015/0154193 A1* | 6/2015 | Dave | ..................... | G06F 16/334 707/748 |
| 2015/0193505 A1* | 7/2015 | Ryu | .................... | G06F 16/3331 707/723 |
| 2015/0242417 A1* | 8/2015 | Spurlock | ............ | G06F 16/2228 707/694 |

OTHER PUBLICATIONS

Chakaravarthy, V. et al. "Efficiently Linking Text Documents with Relevant Structured Information". VLDB '06, Sep. 12-15, 2006. Seoul, Korea. Copyright 2006 VLDB Endowment, ACM. pp. 667-678.
Metwally, A. et al. "V-SMART-Join: A Scalable MapReduce Framework for All-Pair Similarity Joins of Multisets and Vectors". Proceedings of the VLDB Endowment, vol. 5, No. 8. Copyright 2012 VLDB Endowment. Aug. 27-31, Istanbul, Turkey. pp. 704-715.
Monica, K. et al. "Suvey on Big Data by Coodinating Mapreduce to Integrate Variety of Data". International Journal of Science and Research (IJSR) ISSN (Online): 2319-7064. Paper ID: 02013464. vol. 2 Issue 11, Nov. 2013. pp. 427-432. <www.ijsr.net>.
Vernica, R. et al. "Efficient Parallel Set-Similarity Joins Using MapReduce". SIGMOD '10, Jun. 6-10, Indianapolis, Indiana, USA. Copyright 2010. ACM. pp. 495-506.
Appendix P: List of IBM Patents or Patent Applications Treated as Related, Dated Aug. 5, 2016, pp. 1-2.
U.S. Appl. No. 141837,804, filed Aug. 27, 2015; Entitled "System and a Method for Associating Contextual Structured Data with Unstructured Documents on Map-Reduce".

* cited by examiner

SYSTEM AND A METHOD FOR ASSOCIATING CONTEXTUAL STRUCTURED DATA WITH UNSTRUCTURED DOCUMENTS ON MAP-REDUCE

BACKGROUND

The present invention relates generally to relationships among unstructured documents and structured data stored on a Hadoop® distributed file system (HDFS), and in particular to identifying and associating relevant structured data with unstructured documents on MapReduce.

Hadoop® distributed file system (HDFS) is an open-source software framework for distributed storage and distributed processing of large data sets on computer clusters built from commodity hardware. HDFS is highly fault-tolerant and is designed to be deployed on low-cost hardware. HDFS provides high throughput access to application data and is suitable for applications which have large data sets. HDFS consists of a storage part and a processing part (e.g., MapReduce). HDFS splits files into large blocks and distributes them amongst the nodes in the cluster. To process the data, MapReduce transfers packaged code for nodes to process in parallel, based on the data each node needs to process.

MapReduce is a programming model and an associated implementation for processing large data sets with a parallel, distributed algorithm on a cluster. A MapReduce program is composed of a map procedure which processes the data stored on HDFS and generates intermediate data; and a reduce procedure which processes the intermediate data generated by map task. The MapReduce orchestrates the processing by marshaling the distributed servers, running the various tasks in parallel, managing the communications and data transfers between the various parts of the system, and providing for redundancy and fault tolerance.

Information content in an enterprise may be structured or unstructured. Examples of structured content include payroll information, sales orders, invoices, customer profiles, etc. Unstructured content may include e-mails, reports, web pages, customer complaints, product information, etc. Large volumes of structured and unstructured content arises in various real-life use cases, and it is a desired aspect in accordance with the present invention to utilize a MapReduce platform to analyze such data.

The file system, HDFS, handles huge amounts of data, and generally accomplishes this by breaking the data down into fixed-size blocks and storing these blocks on clusters of commodity hardware. Multiple copies of data are stored for fault tolerance's sake and for providing maximal parallelization.

SUMMARY

Aspects of an embodiment of the present invention disclose an approach for integrating documents. In one embodiment, a processor extracts a first set of keywords from at least one structured document. In one embodiment, a processor generates a first batch of keywords from the first set of keywords, wherein each keyword in the first batch of keywords includes a weight. In one embodiment, a processor extracts a second set of keywords from at least one unstructured document. In one embodiment, a processor compares the first batch of keywords to the second set of keywords. In one embodiment, a processor determines that the at least one unstructured document matches, based on a predetermined threshold, the at least one structured document, based on the comparison of the first batch of keywords to the second set of keywords. In one embodiment, a processors removes the at least one unstructured document from a list of unstructured documents which are to be processed.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "module", or "system." Furthermore, aspects of the present invention may take the form of a computer program product embodied in one or more computer readable medium(s) having computer readable program code/instructions embodied thereon.

Embodiments of the present invention discloses an approach for context oriented integration of unstructured documents with structured data on MapReduce/Hadoop® distributed file system.

The present invention will now be described in detail with reference to the Figures.

Figure 1:
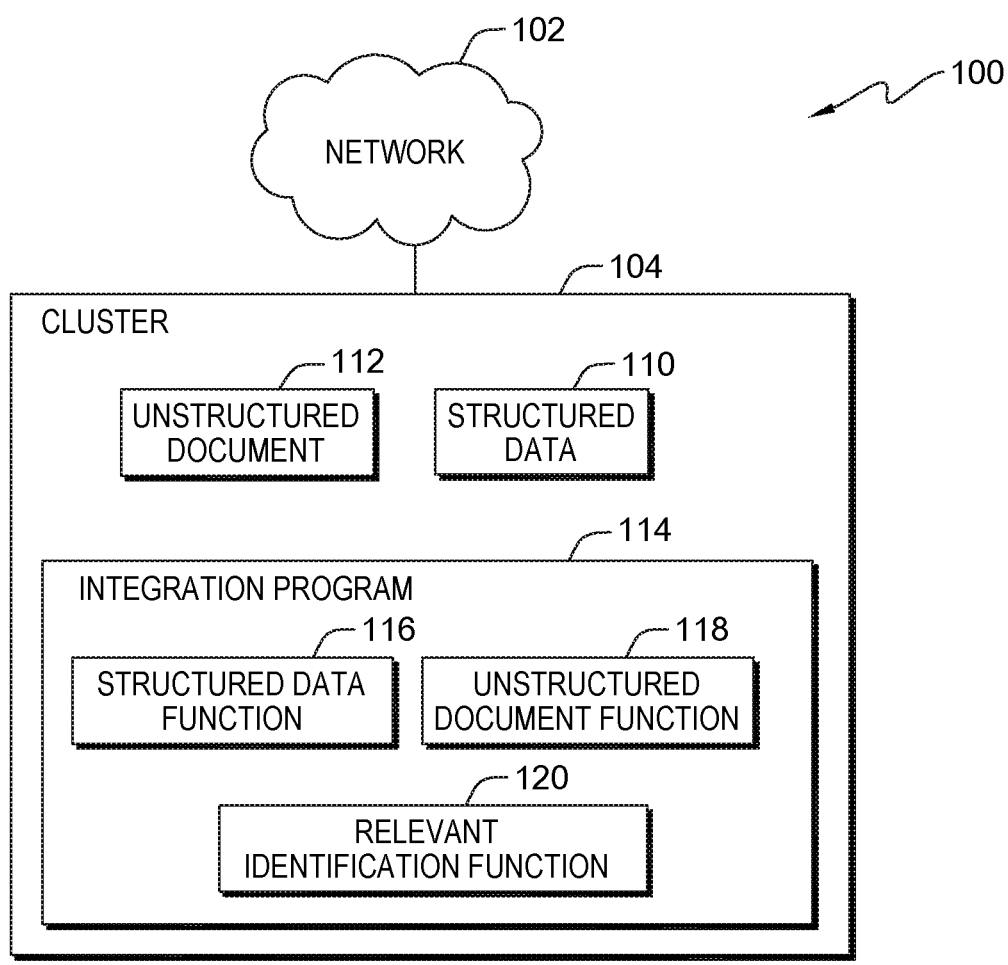
FIG. 1 depicts a block diagram depicting a computing environment, in accordance with one embodiment of the present invention.

FIG. 1 depicts a block diagram of computing environment 100 in accordance with one embodiment of the present invention. FIG. 1 provides an illustration of one embodiment and does not imply any limitations regarding the computing environment in which different embodiments may be implemented. In the depicted embodiment, computing environment 100 includes, but is not limited to, network 102 and cluster 104. Computing environment 100 may include additional computing devices, servers, computers, components, or additional devices not shown. It should be appreciated that FIG. 1 provides only an illustration of one implementation and does not imply any limitations with regard to the environments in which different embodiments may be implemented. Many modifications to the depicted environment may be made.

Network 102 may be a local area network (LAN), a wide area network (WAN) such as the Internet, any combination thereof, or any combination of connections and protocols support communications between cluster 104 in accordance with embodiments of the invention. Network 102 may include wired, wireless, or fiber optic connections.

Cluster 104 may be a computational cluster, a management server, a web server, or additional electronic device or computing system capable of processing program instructions and receiving and sending data. In one embodiment cluster 104 is a special type of computational cluster designed specifically for storing and analyzing large amounts of unstructured and structured data in a distributed computing environment. In other embodiments, cluster 104 is a connection of computers which have a node set to perform a similar task. In some embodiments, cluster 104 may be a laptop computer, tablet computer, netbook computer, personal computer (PC), desktop computer, or any programmable electronic device capable of communicating with additional devices via network 102. In additional embodiments, cluster 104 may represent a server computing system utilizing multiple computers as a server system, such as in a cloud computing environment. In other embodiments, cluster 104 represents a computing system utilizing clustered computers and nodes to act as a single pool of seamless resources. In the depicted embodiment, cluster 104 includes integration program 114, structured data 110, and unstructured document 112. In additional embodiments, cluster 104 may include additional programs, storage devices, or components not shown.

Structured data 110 is a document which has a structured format. Structured data 110 resides in a fixed field within the document. The context for structured data 110 comprises a set of attributes and the corresponding values. This information may be distributed across a set of tables. Structured data 110 may also be a document where some method of embedded coding, such as mark-up, is used to give the whole, and parts, of the document various structural meanings according to a schema. A structured document is a document whose mark-up doesn't break the schema and is designed to conform to and which obeys the syntax rules of its mark-up language. This includes defining what fields of data are stored and how the data is stored, for example, data type (e.g., numeric, currency, alphabetic, name, date, address) and any restrictions on the data input (e.g., amount of characters; restricted to certain terms such as Mr., Ms. or Dr.; M or F). Examples of structured data may be, but is not limited to, payroll, sales orders, invoices, or customer profiles. Structured data 110 is stored on a HDFS platform. In the depicted embodiment, structured data 110 is located on cluster 104. In additional embodiments structured data 110 may be located on additional servers, computing devices, or computers, provided structured data 110 is accessible to integration program 114.

Unstructured document 112 is a document which either does not have a pre-defined data model or is not organized in a predefined manner. An unstructured document is a document where the information within the document does not conform to a method of embedded coding, or the information does not reside in a traditional row column structure. Examples of unstructured document 112 include e-mail messages, word processing documents, sales complaints, webpages, and many additional kinds of documents. Unstructured document 112 is also stored on a HDFS platform. In the depicted embodiment, unstructured document 112 is located on cluster 104. In additional embodiments, unstructured document 112 may be located on additional servers, computing devices, or computers, provided unstructured document 112 is accessible to integration program 114.

Integration program 114 controls the content integration of structured data 110 and unstructured document 112 in a HDFS. Integration 114 converts structured data into a set of words, organizing the set of words on HDFS, identifying the keywords and generating the keyword's weights which signify the keyword's importance. In other embodiments, integration program 114 performs this process simultaneously on a plurality of unstructured documents (e.g., unstructured document 112) and structured data (e.g., structured data 110). In the depicted embodiment, integration program 114 resides on cluster 104. In the depicted embodiment, integration program 114 resides on cluster 104. In other embodiments, integration program 114 can reside on cluster 104, other servers, or computing devices, provided integration program 114 can access structured data 110, and unstructured document 112.

Structured data function 116, a function of integration program 114, controls the modification and alteration to the data within structured data 110. The modifications and alterations to structured data 110 can include, for example reorganizing the data, relocating the data, placing the data in a tabular form, or other forms of modification to structured data 110, to enhance accessibility by integration program 114. Structured data function 116 receives structured data 110 and converts structured data 110 to a tabular format. Specifically structured data function 116 pulls structured data 110 information which is distributed across a set of tables and constructs a set of keywords for each structured data 110. This set of keywords constitutes the context of structured data 110. Thus for each data set, a set of keywords is constructed. Structured data function 116 then organizes this list of sets on a HDFS. The organization is completed in a manner so relevant identification function 120 is able to quickly process the set of keywords. In one embodiment, the structured data is organized on HDFS in such a way so that structured data 110 containing a particular keyword can be extracted quickly.

Structured data function 116 also generates keyword lists. The parameters which determines if a word or phrase is a keyword may be set by, for example, integration program 114, a third party, or another program. The words in the list of keywords are given a priority or weight to determine a hierarchy within the list of keywords. A keyword weight signifies the number of structured data 110 which contain the keyword in a certain context. In other words, the weights relate to how common the word is within structured data-set. This information facilitates the search process. The larger the keyword weight, the lesser the amount of data which contain the keyword in their context. These weights are constructed by structured data function 116 with the relevant parameters (i.e., the actual mathematical details being used to construct these weights) being provided by the administrative user. In the depicted embodiment, structured data function 116 is a MapReduce script which runs on cluster 104.

Unstructured document function 118 controls the modification of the data within unstructured document 112. Unstructured document function 118 receives an unstructured document 112, parses it, and finds the keywords which are represented as a set. Unstructured document function 118 then organizes these sets of keywords on a HDFS. This organization is done in such a way so that it helps in quick processing by relevant identification function 120. In one embodiment, this data is organized on a HDFS in such a way so that unstructured documents containing a particular keyword as the highest weighted keyword can be extracted quickly. In the depicted embodiment, unstructured document function 118 is a MapReduce script which runs on cluster 104.

Relevant identification function 120 prioritizes and reprioritizes keyword lists. Relevant identification function 120 examines unstructured document 112 for keywords. In one embodiment, relevant identification function 120 examines unstructured document 112 for the keywords. In additional embodiments, relevant identification function 120 examines unstructured document 112 for one or a set of the keywords at a time. Relevant identification function 120 calculates a similarity score for unstructured document 112. The similarity score relates to the occurrence of keyword or keywords in unstructured document 112. Relevant identification function 120 also calculates a residual value for unstructured document 112. The residual value for unstructured document 112 relates to the sum of the weights of unprocessed keywords. The resolving of unstructured document 112 is calculated by comparing the similarity score and the residual value. In the depicted embodiment, relevant identification function 120 is part of integration program 114. In additional embodiments, relevant identification function 120 may stand alone as a program located on cluster 104 or any additional computing device, provided relevant identification function 120 is accessible to integration program 114, structured data 110, and unstructured document 112.

In one embodiment, relevant identification function 120 is given two lists, one list is set A and one list is set B, relevant identification function 120 finds for each set data which is more relevant to both sets. The similarity score between two sets A and B is the sum of the weight of keywords common in sets A and B. A similarity join of two lists of sets A and B, finds pairs of the sets so that the similarity score of set A and B is greater than a predetermined threshold. The keywords generated are used to optimize the processing by relevant identification function 120. If the similarity score is greater than the residual weight, this is an indication a keyword selected from structured data 110 is more relevant to unstructured document 112.

Figure 2:
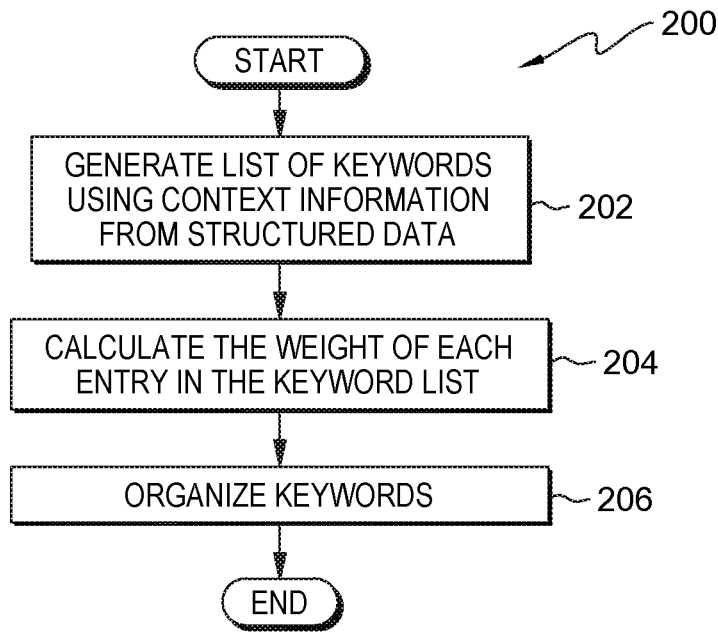
FIG. 2 depicts a flowchart of the operational step taken by an integration program to assess the structured data and create the keyword list, within the computing environment of FIG. 1, in accordance with an embodiment of the present invention.

FIG. 2 depicts a flowchart of operations performed by structured data function 116, a function of integration program 114, to access the structured data and create the keyword list, within computing environment 100 of FIG. 1, in accordance with an embodiment of the present invention. Flowchart 200 depicts the processing of structured data 110 and the generation of the keyword list. It should be appreciated FIG. 2 provides only an illustration of one implementation and does not imply any limitations with regard to the environments in which different embodiments may be implemented. Many modifications to the depicted environment may be made.

In step 202, structured data function 116 generates a list of keywords using context information from structured data. Structured data function 116 retrieves context information of structured data 110 which may be distributed across a set of tables and converts this context information into a set of keywords. In some embodiments, this process is repeated for a quantity of structured data 110 involved. The extracted data may be, for example, customer, store, product, manufacturer, name, address, age, gender, account number etc. Structured data function 116 generates data which is used to generate a set of keywords, wherein the set of keywords are used to guide the processing by relevant identification function 120 computation. Structured data function 116 uses the tabular form of structured data 110 to generate a list of keywords. In some embodiments, integration program 114, or a third party, sets a predetermined threshold value for the amount of keywords extracted or may provide information how to identify keywords or avoid non-information words (e.g., pronouns).

In step 204, structured data function 116 calculates the weight of each entry in the keyword list. Structured data function 116 gives a value to each entry in the keyword list. The weights represent how frequently the word occurs in the context of structured data 110. The larger the weight, the lesser the number of data in which context it occurs. The exact mathematical details to compute the weight are provided by integration program 114 or a third party.

In step 206, structured data function 116 organizes the keyword list. Structured data function 116 organizes the keyword list to allow for more efficient processing in the future. In one embodiment, keywords from the keyword list are organized in decreasing or increase order based on weight. In another embodiment, structured data function 116 groups the keywords based on weight to create keyword sets, which can be organized in decreasing order of weights. In one embodiment, structured data function 116 may organize the keywords based on, for example, weight, topic, and subject. The keywords can be organized in a database management system (DBMS) or in an HBase®.

Figure 3:
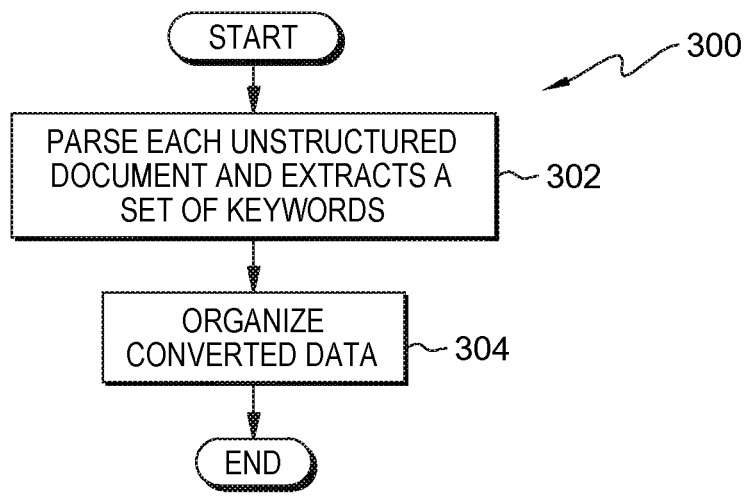
FIG. 3 depicts a flowchart of the operational step taken by an integration program to assess the unstructured documents, within the computing environment of FIG. 1, in accordance with an embodiment of the present invention.

FIG. 3 depicts a flowchart of the operational step taken by unstructured document function 118, a function of integration program 114, to assess the unstructured documents (e.g., unstructured document 112), within computing environment 100 of FIG. 1, in accordance with an embodiment of the present invention. Flowchart 300 depicts the conversion of the unstructured documents into a list of sets of keywords It should be appreciated FIG. 3 provides only an illustration of one implementation and does not imply any limitations with regard to the environments in which different embodiments may be implemented. Many modifications to the depicted environment may be made.

In step 302, unstructured document function 118 parses each unstructured document and extracts a set of keywords. In one embodiment, unstructured document function 118 uses natural language processing to parse the set of keywords out of unstructured document 112, wherein the set of keywords extracted are based on the set of keywords generated by structured data function 116. In another embodiment, unstructured document function 118 uses a form of text analytics to extract the set of keywords out of unstructured document 112, wherein the set of keywords extracted are based on the set of keywords generated by structured data function 116. In other embodiments, the set of keywords which unstructured document function 118 parses from each unstructured document 112 may be based on a different set of requirements which are not affected by the set of keywords generated by structured data function 116. The set of keywords generated by structured data function 116 can be used for this process. The extracted data may be, for example, customer, store, product, manufacturer, name, address, age, gender, account number, or additional information which is in an unstructured document 112.

In step 304, unstructured document function 118 organizes the converted data. The data is organized to assist relevant identification function 120 in future calculations. Unstructured document function 118 organizes the converted data by, for example, the associated weight of the data, the converted data's relevance to a predetermined set of topics, the converted data's similarity to the keywords created from structured data 110 categorically, chronologically, or other methods of organizing data. In one embodiment, unstructured document function 118 stores the organized data in a storage repository. In one embodiment, unstructured document function 118 organizes the converted data on a HDFS.

Figure 4:
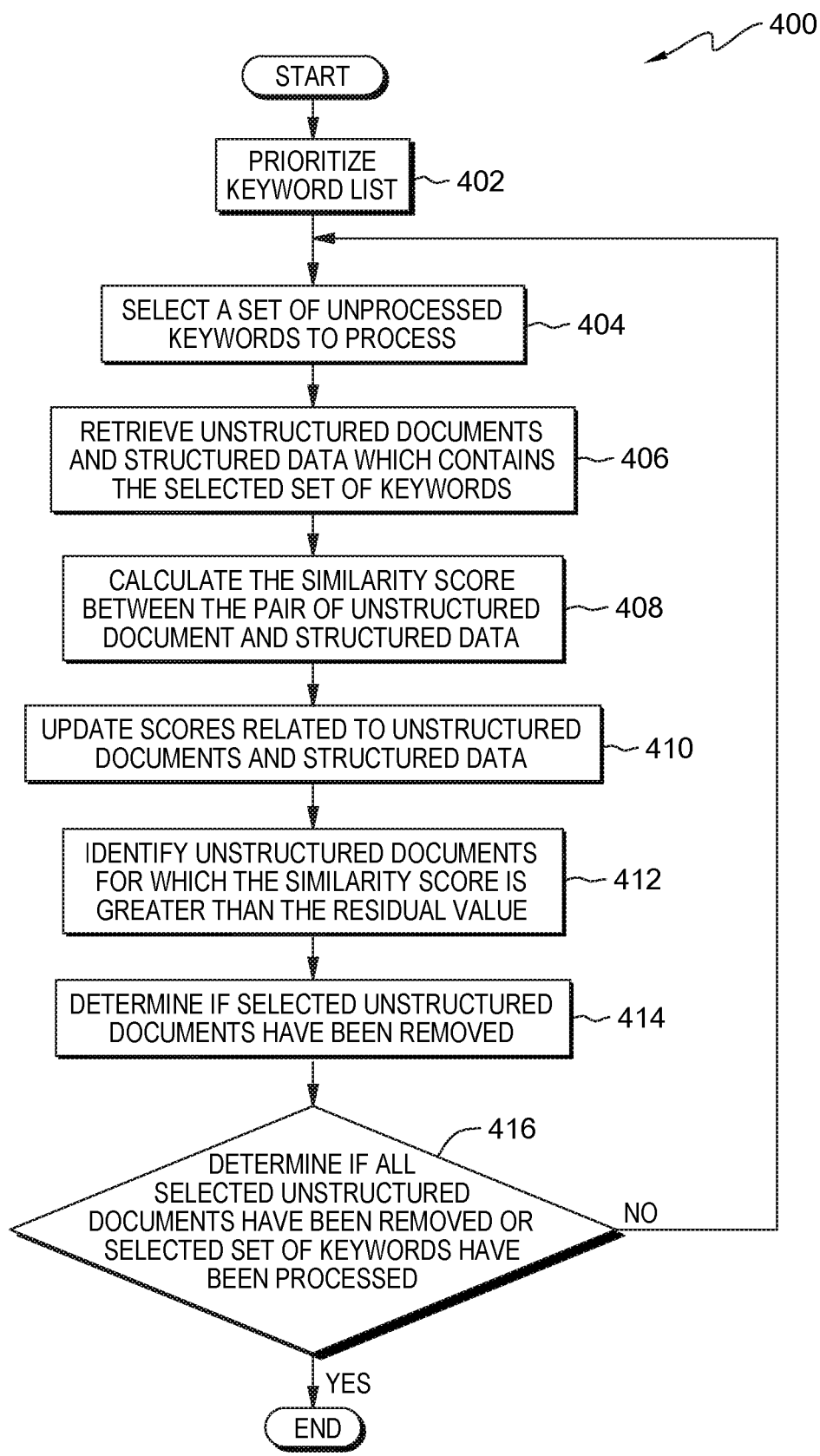
FIG. 4 depicts a flowchart of the operational step taken by an integration program to perform the relevant identification process, within the computing environment of FIG. 1, in accordance with an embodiment of the present invention.

FIG. 4 depicts a flowchart of the operational step taken by relevant identification function 120, a function of integration program 114, to perform the relevant identification process, within computing environment 100 of FIG. 1, in accordance with an embodiment of the present invention. Flowchart 400 depicts the relevant identification process. It should be appreciated FIG. 4 provides only an illustration of one implementation and does not imply any limitations with regard to the environments in which different embodiments may be implemented. Many modifications to the depicted environment may be made.

In step 402, relevant identification function 120 prioritizes the keywords. Relevant identification function 120 uses the weighted keyword list created by unstructured document function 118 to prioritize the list of keywords. In one embodiment, the keyword with a predetermined weight is selected first, wherein the predetermined weight, may be, for example, the largest or the smallest weight. In one embodiment, relevant identification function 120 prioritizes the keywords in a set of batches. There can be a plurality of batches each containing a number of keywords. In one embodiment, relevant identification function 120 processes the keywords one by one. In another embodiment, relevant identification function 120 uses the keywords batched in sequential order based on the weights of the keywords in each batch.

In step 404, relevant identification function 120 selects a set of unprocessed keywords to process and marks these keywords as processed. In one embodiment, relevant identification function 120 selects the set of keywords based on the relevance of the keywords. In another embodiment, the keywords are assigned a score related to the relevancy of each keyword, and relevant identification function 120 selects a predetermined number of these keywords starting with the keywords which are assigned the highest score. In yet another embodiment, relevant identification function 120 selects the set of unprocessed keywords at random.

In step 406, relevant identification function 120 retrieves unstructured documents and structured data which contain the selected keywords. In one embodiment, relevant identification function 120 retrieves structured data which contains the selected keywords in their context. Relevant identification function 120 using the selected keywords and processes the data of unstructured document 112 to detect which of the keywords are referenced or present in the data of unstructured document 112. In one embodiment, relevant identification function 120 processes each keyword individually. In other embodiments, relevant identification function 120 processes a group of keywords at a time in a batch. The processing searches the data from unstructured document 112 to locate relevant data. In one embodiment, relevant identification function 120 performs the processing on several unstructured documents simultaneously. In another embodiment, unstructured documents and structured data is organized on an HDFS so that the retrieval process is carried out more efficiently.

In step 408, relevant identification function 120 calculates the similarity score between the unstructured document and structured data. The similarity score is the sum of the weights of the common keywords in unstructured document 112 and structured data 110. In other embodiments, the similarity score is calculated based on other factors as well as the value of the keywords in the batch which is used in step 302 to process unstructured document 112. Examples of these factors if the keyword is referenced in just unstructured document 112, or if the keyword is present within unstructured document 112. In some embodiments, relevant identification function 120 performs the calculation on a plurality of unstructured documents simultaneously. In one embodiment, relevant identification function 120 also initializes three counters for unstructured document 112, these counters are data score, counter score, and residual score. One data counter maintains structured data 110 which is involved in the process. The counter score maintains the corresponding similarity score between unstructured document 112 and structured data 110. The residual score counter maintains the sum of keywords in unstructured document 112 which are not processed.

In step 410, relevant identification function 120 updates the scores related to unstructured documents and structured data. In one embodiment, if relevant identification function 120 locates a structured data 110 and unstructured document 112 whose similarity score is greater than the data score, the counter score and residual score are updated. The counter residual score is updated by reducing the sum of the weights of keywords which relevant identification function 120 selects and are present in unstructured document 112. The scores which are updated may be, for example, previous similarity scores between structured data 110 and unstructured document 112 or residual values. The residual value is the sum of the values of the keywords from the batch which relevant identification function 120 does not process. These unprocessed keywords are keywords which are not present in unstructured document 112 or are not referenced in unstructured document 112. In some embodiments, relevant identification function 120 calculates the residual value from the remainder of the keyword values in the current batch and the other batches of keywords.

In step 412, relevant identification function 120 identifies unstructured documents for which the similarity score is greater than the residual value. Relevant identification function 120 searches the unstructured documents which have been analyzed and selects the quantity of unstructured documents which have a similarity score which is greater than that of the associated residual value. In some embodiments, relevant identification function 120 selects the unstructured documents which have a similarity score which is greater than or equal to the residual value.

In step 414, relevant identification function 120 removes selected unstructured document from the list of unstructured documents. Relevant identification function 120 removes unstructured document 112 from the list of unstructured documents which have not been processed. If unstructured document 112 has a similarity score which is greater than the residual value, unstructured document 112 is resolved. This means unstructured document 112 has the relevant information located and is useable with the information from structured data 110. In some embodiments, relevant identification function 120 removes the unstructured document from the current list and places unstructured document 112 in another list. The list is a group of unstructured documents which are to be processed by relevant identification function 120.

In decision 416, relevant identification function 120 determines if the selected unstructured documents have been removed. Relevant identification function 120 processes the list of unstructured documents and the list selected keywords to determine if a quantity of the selected unstructured documents have been removed because the similarity score is greater than the residual value, or relevant identification function 120 determines if structured data 110 in the list of selected keywords has been processed. In one embodiment, relevant identification function 120 determines the selected unstructured documents have been removed when the selected set of keywords have been processed. This determination is made because if the selected set of keywords have been processed then the unstructured documents which are involved would have been removed because of the presence of the keywords in the unstructured documents. In one embodiment, relevant identification function 120 determines if both the selected unstructured documents have been removed and the selected set of keywords have been processed. In other embodiments, relevant identification function 120 determines if majority of the selected set of keywords have been processed up to a predetermined number of keywords. In another embodiment, relevant identification function 120 determines if a majority of the selected unstructured documents have been removed up to a predetermined value of the set of unstructured documents. If relevant identification function 120 determines the selected unstructured documents have been removed or the set of keywords has been processed (decision 418, yes branch), relevant identification function 120 finishes the operation. If relevant identification function 120 determines the selected unstructured documents have not been removed, or the set of keywords has not been processed (decision 418, no branch, proceed to step 404), relevant identification function 120 selects a set of unprocessed keywords to process and marks the keywords as processed and proceeds to step 406.

In one embodiment, if the similarity score is not greater than the residual value, relevant identification function 120 reprioritizes the keywords in the current batch of keywords. This can involve, for example, removing certain keywords, adding new keywords, altering the value associated with the keyword or keywords, combining the batch of keywords with other batches of keywords, or altering other aspects of the current batch of keywords to potentially produce a similarity score which is greater than the residual value. In some embodiments, relevant identification function 120 does not reprioritize the keyword list. In other embodiments, the keyword list is modified by integration program 114 or a third party.

Figure 5:
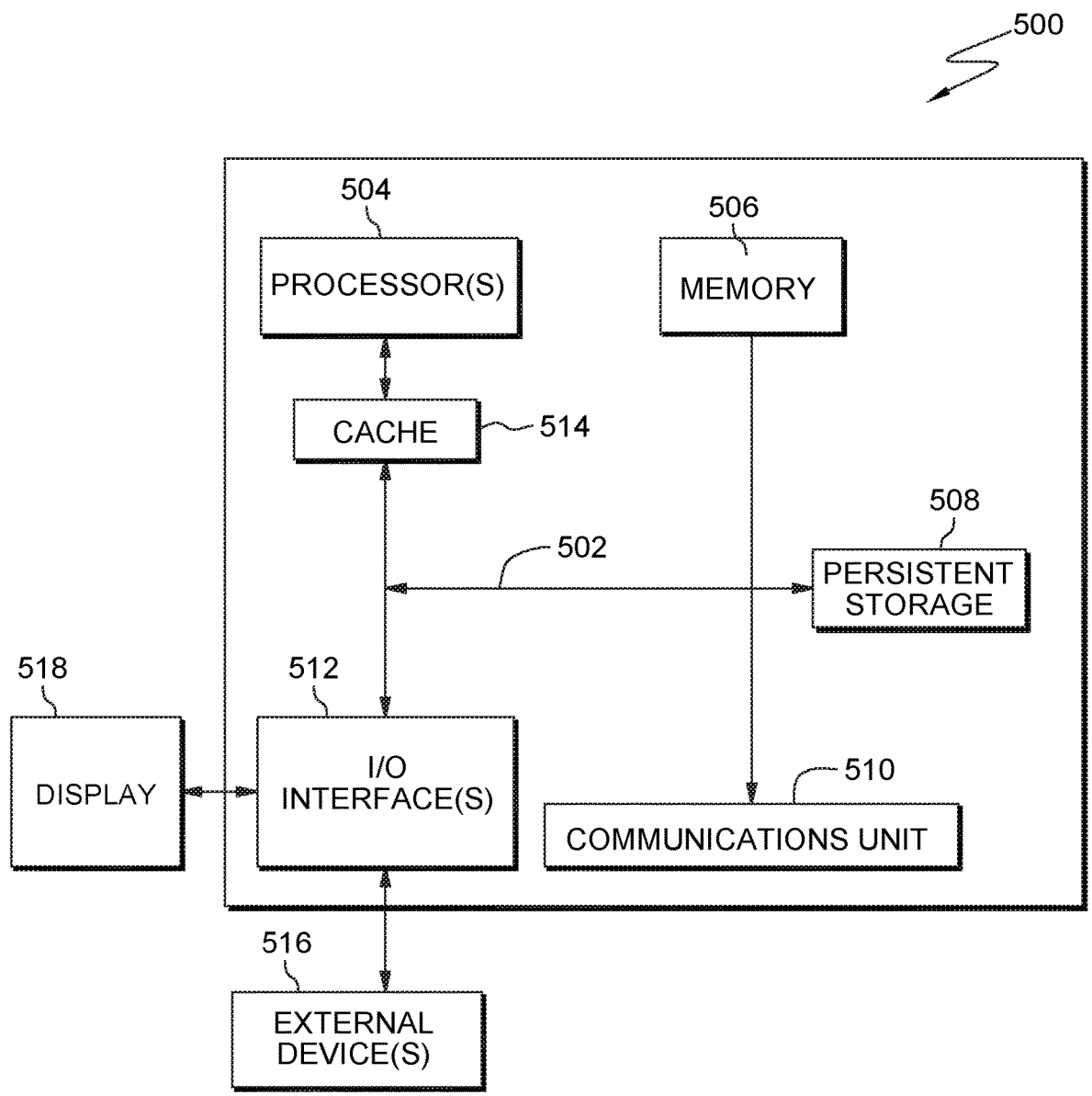
FIG. 5 depicts a block diagram depicting the internal and external components of the cluster of FIG. 1, in accordance with one embodiment of the present invention.

FIG. 5 depicts a block diagram depicting the internal and external components of the server of FIG. 1, in accordance with one embodiment of the present invention. It should be appreciated FIG. 5 provides only an illustration of one implementation and does not imply any limitations with regard to the environments in which different embodiments may be implemented. Many modifications to the depicted environment may be made.

Cluster 104 includes communications fabric 502, which provides communications between computer processor(s) 504, memory 506, persistent storage 508, communications unit 510, and input/output (I/O) interface(s) 512. Communications fabric 502 may be implemented with any architecture designed for passing data and/or control information between processors (such as microprocessors, communications and network processors, etc.), system memory, peripheral devices, and any additional hardware components within a system. For example, communications fabric 502 may be implemented with one or more buses.

Memory 506 and persistent storage 508 are computer-readable storage media. In one embodiment, memory 506 includes random access memory (RAM) and cache memory 514. In general, memory 506 may include any suitable volatile or non-volatile computer-readable storage media.

Memory 506 is stored for execution by one or more of the respective computer processors 504 of cluster 104 via one or more memories of memory 506 of cluster 104. In the depicted embodiment, persistent storage 508 includes a magnetic hard disk drive. Alternatively, or in addition to a magnetic hard disk drive, persistent storage 508 may include a solid state hard drive, a semiconductor storage device, read-only memory (ROM), erasable programmable read-only memory (EPROM), flash memory, or any additional computer-readable storage media which is capable of storing program instructions or digital information.

The media used by persistent storage 508 may also be removable. For example, a removable hard drive may be used for persistent storage 508. Additional examples include optical and magnetic disks, thumb drives, and smart cards which are inserted into a drive for transfer onto another computer-readable storage medium which is also part of persistent storage 508.

Communications unit 510, in the examples, provides for communications with additional data processing systems or devices, including cluster 104. In the examples, communications unit 510 includes one or more network interface cards. Communications unit 510 may provide communications through the use of either or both physical and wireless communications links.

I/O interface(s) 512 allows for input and output of data with additional devices which may be connected to cluster 104. For example, I/O interface 512 may provide a connection to external devices 516 such as a keyboard, keypad, camera, a touch screen, and/or some additional suitable input device. External devices 516 may also include portable computer-readable storage media such as, for example, thumb drives, portable optical or magnetic disks, and memory cards. Software and data used to practice embodiments of the present invention, e.g., integration program 114 may be stored on such portable computer-readable storage media and may be loaded onto persistent storage 508 of cluster 104 via I/O interface(s) 512 of cluster 104. Software and data used to practice embodiments of the present invention, e.g., integration program 114 may be stored on such portable computer-readable storage media and may be loaded onto persistent storage 508 of cluster 104 via I/O interface(s) 512 of cluster 104. I/O interface(s) 512 also connect to a display 518.

Display 518 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device which may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or additional freely propagating electromagnetic waves, electromagnetic waves propagating through a waveguide or additional transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or additional programmable data processing apparatus to produce a machine, such that the instructions, which execute via the processor of the computer or additional programmable data processing apparatus, create means for implementing the functions/acts specified in the flowchart and/or block diagram block or blocks. These computer readable program instructions may also be stored in a computer readable storage medium which may direct a computer, a programmable data processing apparatus, and/or additional devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, additional programmable data processing apparatus, or additional device to cause a series of operational steps to be performed on the computer, additional programmable apparatus or additional device to produce a computer implemented process, such that the instructions which execute on the computer, additional programmable apparatus, or additional device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method for integrating documents, the method comprising:

extracting, by one or more processors, and via a first MapReduce script, a first set of keywords from at least one structured document;

generating, by one or more processors, a first batch of keywords from the first set of keywords, wherein each given keyword in the first batch of keywords is assigned a respectively corresponding weight, wherein each respectively corresponding weight is based on a number of times the given keyword appears in the structured data;

extracting, by one or more processors, and via a second MapReduce script, a second set of keywords from at least one unstructured document;

comparing, by one or more processors, the first batch of keywords to the second set of keywords;

determining, by one or more processors, that the at least one unstructured document matches, based on a predetermined threshold, the at least one structured document, based on the comparison of the first batch of keywords to the second set of keywords, to produce an output dataset; and storing the output dataset in a storage repository in a storage location that is selected based on a keyword in the unstructured document and the respectively corresponding weight assigned to each keyword in the structured data;

wherein the at least one structured document, the at least one unstructured document, and the output dataset, are stored in a MapReduce distributed storage system.

2. The method of claim 1, wherein the respectively corresponding weight of each keyword in the first batch of keywords indicates a frequency of appearance in the at least one structured document.

3. The method of claim 1, wherein generating the first batch of keywords from the first set of keywords further comprises:

prioritizing, by one or more processors, the first batch of keywords based on the respectively corresponding weight of each keyword in the first batch of keywords.

4. The method of claim 3, wherein comparing the first batch of keywords to the second set of keywords comprises:

comparing, by one or more processors, the first batch of keywords to the second set of keywords based on the respectively corresponding weight associated with each keyword in the first batch of keywords.

5. The method of claim 1, wherein extracting the second set of keywords from at least one unstructured document comprises:

extracting, by one or more processors, the second set of keywords from the at least one unstructured document based on a presence of at least one keyword of the first batch of keywords in the at least one unstructured document.

6. The method of claim 1, further comprising:

processing, by one or more processors, the list of unstructured documents until a minimum number of keywords from the first set of keywords have been processed.

7. The method of claim 1, further comprising:

determining, by one or more processors, that a minimum number of the at least one unstructured document from the list of unstructured documents have not been removed;

generating, by one or more processors, a second batch of keywords from the first set of keywords, wherein each keyword in the second batch of keywords includes a respectively corresponding weight;

extracting, by one or more processors, a third set of keywords from at least one unstructured document;

comparing, by one or more processors, the third batch of keywords to the third set of keywords; and determining, by one or more processors, that the at least one unstructured document matches, based on a predetermined threshold, the at least one structured document, based on the comparison of the second batch of keywords to the third set of keywords.

* * * * *